United States Patent [19]

Bissing et al.

[11] 3,758,571

[45] Sept. 11, 1973

[54] PREPARATION OF MONOHALOACETYL HALIDES

[75] Inventors: Donald E. Bissing; Virgil W. Gash, both of Ballwin, Mo.

[73] Assignee: Monsanto Company, St. Louis, Mo.

[22] Filed: Aug. 4, 1972

[21] Appl. No.: 277,961

Related U.S. Application Data

[63] Continuation-in-part of Ser. No. 192,647, Oct. 26, 1971, abandoned.

[52] U.S. Cl............................................. 260/544 Y
[51] Int. Cl...................... C07c 53/14, C07c 51/58
[58] Field of Search................................. 260/544 Y

[56] References Cited

FOREIGN PATENTS OR APPLICATIONS

782,773   9/1957   Great Britain.................. 260/544 Y

*Primary Examiner*—Lorraine A. Weinberger
*Assistant Examiner*—Richard D. Kelly
*Attorney*—Neal E. Willis, John L. Young et al.

[57] ABSTRACT

A process for the preparation of monohaloacyl halides by halogenating ketenes in the presence of an alicyclic carbonate.

15 Claims, No Drawings

PREPARATION OF MONOHALOACETYL HALIDES

This application is a continuation-in-part of copending application Ser. No. 192,647 filed Oct. 26, 1971, now abandoned.

This invention relates to the preparation of monohaloacyl halides by the liquid phase halogenation of ketenes. More particularly, this invention relates to the halogenation of ketenes in the presence of a solvent or a reaction medium that inhibits or prevents the formation of polyhaloacyl halides and minimizes the formation of acyl halides. The term "halogen" as used herein includes chlorine, bromine, iodine and halogen halides such as iodine monochloride, iodine monobromide, bromine monochloride and the like.

The liquid phase halogenation of ketene is well known but the previously known methods of conducting this reaction have resulted in the formation of monohaloacetyl halides contaminated with a considerable proportion of dihaloacetyl halides and polyhalogenated by-products. These earlier methods utilized such solvents as chlorinated benzenes, nitrobenzene, carbon tetrachloride, chloroacetyl chloride, acetyl chloride, 1,2-dichloroethane, acetonitrile, benzonitrile, nitromethane and various other solvents. Each of these solvents had a common shortcoming; that is, they all resulted in the formation of an appreciable amount of dihaloacetyl halide, together with the desired product, monohaloacetyl halide. In some of these solvents, the undesired trihaloacetyl halides were also formed. The dihalo derivatives have no commercial utility and their separation from the monohalo derivative is expensive and time consuming. For example, dichloroacetyl chloride has a boiling point of approximately 107°C whereas monochloroacetyl chloride has a boiling point of about 105°C. This proximity of the boiling points of these two compounds renders their separation exceedingly difficult and also adds an expensive and uneconomical step to the halogenation process when utilized in the previously known solvents.

The monohaloacetyl halides produced by the process of this invention are valuable intermediates in the production of herbicidal alpha-haloacetanilides and other products. By contrast, the corresponding di- and trihaloacetyl halides have no commercial significance. In other words, they are present merely as diluents which detract from the efficacy of the commercially valuable monohaloacetyl halides. The severity of the problem is evidenced by the fact that all commercially available chloroacetyl chloride is contaminated with appreciable amounts of dichloroacetyl chloride, and in some instances the dichloroacetyl chloride content is as great as six percent.

In accordance with the present invention, the disadvantages of the prior art solvents are overcome by the halogenation of a ketene in the presence of an alicyclic carbonate of the formula

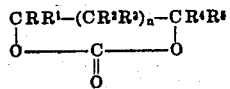

wherein R, $R^1$, $R^2$, $R^3$, $R^4$ and $R^5$ are independently hydrogen, halogen, methyl, chloromethyl or ethyl, and $n$ is an integer of 0 or 1.

The process of the present invention encompasses the halogenation of ketene, i.e., $CH_2=C=O$, as well as substituted ketenes such as methyl ketene, dimethyl ketene, ethyl ketene, diethyl ketene, phenyl ketene, diphenyl ketene and the like.

Ethylene carbonate and other 1,2- and 1,3-alicyclic carbonates can be used alone or in any combination for the purposes of the present invention. Suitable carbonates include, for example, 1,2-propylene carbonate, 1,2-butylene carbonate, 1,3-propylene carbonate, 1,3-butylene carbonate, 2,2-dimethyl-1,3-propylene carbonate, 1,2-diethyl-1,3-propylene carbonate, 1,2-dimethylethylene carbonate, 1-chloromethylethylene carbonate, 1,2-diethylethylene carbonate and the like. When an unsaturated carbonate is introduced into the system, the unsaturation is satisfied by the addition of the halogenating agent to two adjacent carbon atoms originally joined by the double bond. Alicyclic carbonates having seven or more ring members, such as 1,4-butylene carbonate and the like, could be beneficial solvents in the process of the present invention, but are of little practical value in comparison to the five and six membered ring carbonates of this invention.

In carrying out the process of the present invention, the ketene and the halogen are introduced into the carbonate solvent medium where they react to form monohaloacyl halides which are separated from the reaction medium by conventional means such as distillation, preferably at reduced pressure. The process is amenable to either continuous or to batch type operation. The operating conditions under which the reaction is conducted are not critical but it is preferred to maintain them within specified limits to maximize the yield of the monohaloacyl halides. In essence, it is only necessary that the carbonates are liquid under reaction conditions. Because of pratical considerations, however, the reaction is normally conducted within the approximate temperature range of −50°C to 150°C at a pressure from about 50 mm. Hg. to about 2 atmospheres. In most instances, however, it is preferred to operate at a temperature between about 0°C and about 110°C at a pressure between about 100 mm. and about 760 mm. The reaction of the halogen and the ketene will progress to form substantially pure monohaloacyl halides regardless of the mole ratio of the reactants. The advantages of the present invention are more fully realized, however, when the mole ratio of halogen to ketene is maintained between about 0.8:1 and about 2.0:1 and optimum results are obtained with mole ratios of halogen to ketene between about 1:1 and about 1.3:1. The presence of an alicyclic carbonate of the present invention in the reaction medium minimizes the formation of acyl halides and substantially eliminates the formation of dihaloacyl halides and other polyhalogenated byproducts.

In accordance with the present invention, the carbonate can constitute substantially all or only a minor portion of the reaction medium. The benefits of the present invention are most pronounced when the solvent weight ratio is high but substantial benefits are realized even when the carbonate is present in relatively small amounts. The undesirable polyhalogenated acyl halides are formed only in minute amounts even when the reaction medium contains a low ratio of carbonate solvent and they are almost completely excluded at the higher ratios. The weight ratio of the carbonate to the sum of the carbonate and the product, i.e., the solvent weight ratio, can vary from about 0.05:1 to about 0.99:1. In fact, during the normal course of a batch reaction, the solvent weight ratio diminishes with the formation of the product which becomes mixed with the carbonate forming the reaction medium. In the practice of the continuous process, the solvent weight ratio can be maintained constant or varied to desired levels.

The invention will be more clearly understood from the following detailed description of specific examples thereof. In these examples and throughout the specification all proportions are expressed in parts by weight unless otherwise indicated.

is high, i.e., greater than 95 percent, and the amount of dihaloacyl halide is minimized, giving a haloacyl purity of greater than 98 percent. In Example 4, the yield of bromoacetyl bromide is above 85 percent with a purity of greater than 99 percent.

TABLE I

| | Example Number | | | | |
|---|---|---|---|---|---|
| | 2 | 3 | 4 | 5 | 6 |
| | Solvent | | | | |
| | Tetrachloro-ethylene carbonate | 1,3-butylene carbonate | Ethylene carbonate | Chloromethyl-ethylene carbonate | Phenylethylene carbonate |
| Pressure (mm. Hg) | 150 | 760 | 100 | 100 | 760. |
| Temperature (° C.) | 30 | 30 | 40 | 20-25 | 20-25. |
| Ketene | Ketene | Methyl ketene | Ketene | Ketene | Phenyl ketene. |
| Halogen | Chlorine | Chlorine | Bromine | Chlorine | Chlorine. |
| Solvent amount (parts) | 150 | 58 | 150 | 100 | 50. |
| Halogen amount (parts) | 110 | 64 | 218 | 110 | 26. |
| Ketene amount (parts) | 59 | 47 | 52 | 42 | 38. |
| Haloacylhalide | Chloroacetyl chloride | 2-chloro-propionyl chloride | Bromoacetylbromide | Chloroacetyl chloride | 2-chloro-2-phenyl-acetyl chloride. |
| Dihaloacylhalide | Dichloroacetyl chloride | 2,2-dichloropropionyl chloride | Dibromoacetyl bromide | Dichloroacetyl chloride | 2,2-dichloro-2-phenylacetyl chloride. |

EXAMPLE 1

About 200 parts (SOLVENT AMOUNT) of ethylene carbonate (SOLVENT) were charged into a suitable reaction vessel, maintained at an absolute pressure of about 100 mm. Hg. (PRESSURE) and provided with a gas outlet, temperature recording means and two gas spargers below the level of the carbonate. With the reaction medium maintained at a temperature of approximately 45°–50°C (TEMPERATURE), ketene (KETENE) and chlorine (HALOGEN) were introduced through separate spargers at constant and substantially equimolar rates. After about 2½ hours, the addition of the reactants was terminated. About 188 parts (HALOGEN AMOUNT) chlorine and about 95 parts (KETENE AMOUNT) ketene had been added during the course of the reaction. At the termination of the reaction, the ratio of the solvent to the sum of the solvent and product was about 0.44. The reaction mixture was essentially ethylene carbonate, chloroacetyl chloride (HALOACYL HALIDE) with minor amounts of dichloroacetyl chloride (DIHALOACYL HALIDE) and acetyl chloride. Upon distillation to separate the pure chloroacetyl chloride, the mole percent yield of chloroacetyl chloride was determined to be 96 percent, together with about 1.9 percent acetyl chloride and about 2 percent dichloroacetyl chloride.

Although in this example the reaction mass was agitated, agitation is not necessary in the halogenation process of this invention. When bromine is the halogen, it is preferred to agitate the reaction mass but good results are also obtained without agitation.

Following the general procedure of Example 1 but with conditions and materials changed as noted in Table I the indicated products are obtained. The line titles of Table I are shown in parenthesis in the description of Example 1 where appropriate.

In Examples 2, 3, 5 and 6 the yield of haloacyl halide

EXAMPLE 7

To a reactor fitted with spargers and temperature recording means was added 235 parts of 1,2-propylene carbonate. Chlorine and ketene were sparged into the reactor at 100 mm. of Hg pressure with the temperature maintained at 20° to 25°C for approximately 182 minutes. A slight excess of chlorine (with respect to ketene) was maintained in the propylene carbonate solution during the course of the reaction. Fractionation and analysis of the products showed a chloroacetyl chloride yield of 94.6 percent and a dichloroacetyl chloride yield of 0.6 percent. The acetyl chloride yield was 4.8 percent. The chloroacetyl chloride purity was 99.2 percent. Solvent recovery was substantially quantitative.

In order to illustrate the advantages of the solvents of the present invention, the procedure of the foregoing Example 1 was substantially duplicated using other solvents. The percent yields thus obtained, together with the results of Examples 1 and 7 are tabulated below in Table II.

TABLE II

| Solvent | Chloroacetyl Chloride Yield | Chloroacetyl Chloride Purity (%) | Acetyl Chloride Yield | Dichloroacetyl Chloride Yield | Solvent Recovered (%) |
|---|---|---|---|---|---|
| Example 1 | 96 | 98 | 1.9 | 2 | 95 |
| Example 7 | 94.6 | 99.2 | 4.8 | 0.6 | >95 |
| Ethyl Acetate | 92 | 96 | 5 | 3 | 78 |
| Carbon Tetrachloride | 42 | 69 | 43 | 15 | 75 |
| 1,2-Dichloroethylene | 35 | 53 | 41 | 24 | 90 |
| Methyl Acetate | 91 | 94 | 4 | 4 | 88 |
| Acetonitrile | 46 | 83 | 47 | 7 | 66 |
| Nitromethane | 48 | 74 | 39 | 13 | 75 |
| n-Butyl Acetate | 82 | 95 | 15 | 3 | 84 |
| n-Hexyl Acetate | 81 | 95 | 15 | 4 | 83 |
| Benzonitrile | 87 | 94 | 9 | 4 | 92 |

By comparison of the same procedure utilizing other solvents, it is self-evident that the solvents of the present invention substantially suppress the formation of polychloroacetyl chlorides and minimize the formation of acetyl chloride. The separation of pure chloroacetyl chloride from acetyl chloride and the solvent by fractionation presents no problem because of the wide divergence in boiling points of these compounds.

The improvement effected by the carbonate solvents is also evidenced in the better than 90 percent recovery of the solvent for recycle purposes. This provides greatly improved economy of operation. It is also evident from the high percent recovery of the solvents that the beneficial effect exerted by these solvents is due to the intrinsic nature of their chemical structure.

The beneficial results of the present invention are obtained in like manner with other carbonates under consideration as well as with the other aforementioned halogenating agents. Bromine can be introduced into the system as the liquid, combined with the carbonate in solution, or in the gaseous state below the surface of the reaction mass. In most instances it is preferred to conduct brominations in accordance with this invention by using a solution of bromine in the carbonate solvent. When iodine monochloride is used as the halogenating agent, it can be charged into the reactor by dissolving it in the carbonate solvent and then adding the resulting solution to the system.

Although the invention has been described with respect to specific modifications, the details thereof are not to be construed as limitations except to the extent indicated in the following claims.

What is claimed is:

1. A process for the preparation of a monohaloacyl halide which comprises reacting a ketene and a halogen selected from the group consisting of chlorine, bromine, iodine, iodine monochloride, iodine monobromide and bromine monochloride in the presence of an alicyclic carbonate of the formula

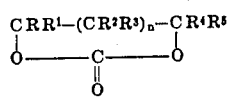

wherein R, R$^1$, R$^2$, R$^3$, R$^4$, and R$^5$ are independently hydrogen, halogen, methyl, chloromethyl or ethyl, and $n$ is an integer of 0 or 1.

2. A process in accordance with claim 1 wherein R, R$^1$, R$^2$, R$^3$, R$^4$ and R$^5$ are hydrogen.

3. A process in accordance with claim 1 wherein $n$ is 1.

4. A process in accordance with claim 1 wherein $n$ is 0.

5. A process in accordance with claim 1 wherein the carbonate is ethylene carbonate.

6. A process in accordance with claim 1 wherein the carbonate is ethylene carbonate and the halogen is chlorine.

7. A process in accordance with claim 1 wherein the carbonate is ethylene carbonate and the halogen is bromine.

8. A process in accordance with claim 1 wherein the carbonate is 1,2-propylene carbonate.

9. A process in accordance with claim 1 wherein the carbonate is 1,3-propylene carbonate.

10. A process of claim 1 wherein the carbonate is tetrachloroethylene carbonate.

11. A process of claim 1 wherein the carbonate is 1,3-butylene carbonate.

12. A process of claim 1 wherein the carbonate is chloromethylethylene carbonate.

13. A process of claim 1 wherein the carbonate is phenylethylene carbonate.

14. A process of claim 1 wherein the ketene is unsubstituted ketene.

15. A process of claim 14 wherein the halogen is chlorine.

* * * * *